(12) United States Patent
Kern et al.

(10) Patent No.: US 11,182,246 B1
(45) Date of Patent: Nov. 23, 2021

(54) CONTINUOUS ERROR CODING

(71) Applicant: Infineon Technologies AG, Neubiberg (DE)

(72) Inventors: Thomas Kern, Aschheim (DE); Christian Badack, Unterhaching (DE); Michael Goessel, Mahlow (DE); Klaus Oberlaender, Neubiberg (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 16/940,751

(22) Filed: Jul. 28, 2020

(51) Int. Cl.
*G06F 11/10* (2006.01)
*G06F 11/30* (2006.01)
*G06F 11/07* (2006.01)

(52) U.S. Cl.
CPC ...... *G06F 11/1068* (2013.01); *G06F 11/0766* (2013.01); *G06F 11/1004* (2013.01); *G06F 11/1044* (2013.01); *G06F 11/3037* (2013.01)

(58) Field of Classification Search
CPC ............. G06F 11/1024; G06F 11/1004; G06F 11/1068; G06F 11/0766; G06F 11/1641; G06F 11/1048
See application file for complete search history.

(56) References Cited

U.S. PATENT DOCUMENTS

| | | | | |
|---|---|---|---|---|
| 6,357,024 B1* | 3/2002 | Dutton | ................ | G06F 11/1641 714/45 |
| 6,453,440 B1* | 9/2002 | Cypher | ............... | G06F 11/1024 714/758 |
| 8,560,899 B2* | 10/2013 | Brewerton | ........... | G11C 29/025 714/718 |
| 2015/0012794 A1* | 1/2015 | Losh | ................... | G06F 11/1048 714/755 |

\* cited by examiner

*Primary Examiner* — Shelly A Chase
(74) *Attorney, Agent, or Firm* — Eschweiler & Potashnik, LLC

(57) ABSTRACT

Systems, methods, and circuitries are disclosed for protecting data throughout read and write operations. In one example a method includes receiving a plurality of data bits; dividing the plurality of data bits into at least two data blocks; generating respective sets of block check bits for each respective data block using a respective first error code; combining the sets of block check bits to generate a set of signature bits for the plurality of data bits; generating a set of cumulative check bits for the plurality of data bits and the set of signature bits using a second error code; and storing, in a memory location, the plurality of data bits, the set of signature bits, and the set of cumulative check bits.

23 Claims, 6 Drawing Sheets

CONTINUOUS ERROR CODING

FIELD

The present disclosure relates to the field of data protection and error coding and in particular to methods, systems, and circuitry protecting data around memory interfaces.

BACKGROUND

Modern systems-on-chip (SoCs) include read/write paths with error-correcting and/or error-detecting encoding and decoding to mitigate the risk of corrupted data negatively impacting SoC functionality.

BRIEF DESCRIPTION OF THE DRAWINGS

Some examples of circuits, apparatuses and/or methods will be described in the following by way of example only. In this context, reference will be made to the accompanying Figures.

DETAILED DESCRIPTION

Figure 1:
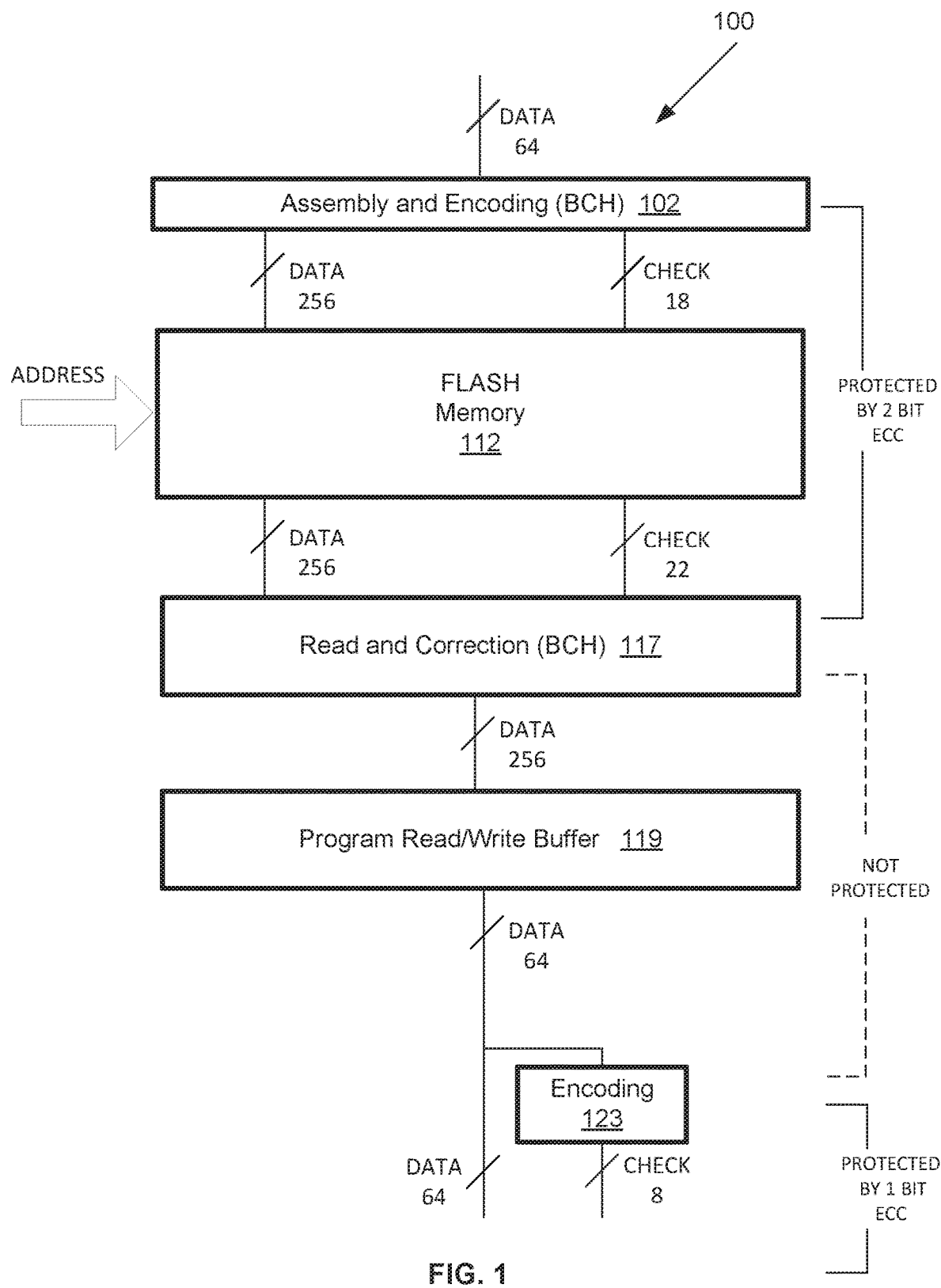
FIG. 1 is a block diagram of a FLASH memory interface that exhibits a break in data protection.

FIG. 1 illustrates a FLASH memory interface 100 that receives, protects, writes, reads, protects, and outputs data from a memory address. The example interface of FIG. 1 includes specific numbers of bits and types of error coding, however, these details are not essential the overall concept being illustrated, which is that gaps may arise in error protection in a memory interface. The interface 100 includes assembly and encoding circuitry 102 that assembles (e.g., concatenates) 4 sets of 64 received data bits into a set of 256 data bits for storage in a FLASH memory 112. The assembly and encoding circuitry 102 also generates 18 check bits for the 256 data bits using a 2 bit Bose-Chaudhuri-Hocquenghem (BCH) error-correcting code. The 18 check bits are stored with the 256 data bits in the FLASH memory cells (e.g., "location") addressed by the write address.

When data is read from the FLASH memory 112, read and correction circuitry 117 reads 256 possibly corrupt bits of data and 18 possibly corrupt check bits from the memory cells addressed by the address. The read and correction circuitry 117 corrects, if necessary, the data bits and check bits read from the memory 112 using the same BCH error-correcting code as was used to generate the check bits by the assembly and encoding circuitry 102. The 256 bits of corrected data are stored in a program read/write buffer 119.

Data being read from the buffer 119 is divided into blocks (e.g., the original 64 bit length blocks or blocks of a different length) and encoding circuitry 123 uses, for example, a 1-bit error-correcting code and a two-bit error detecting code to generate 8 check bits for each block. These check bits may be provided with the corresponding data block to protect the data block as it is read by other components.

While the data is protected by error coding at the input and output of the memory interface 100, it can be seen that the corrected data output by the read and correction circuitry 117 is not protected as it is written to the buffer and read from the buffer 119. Corruption of any data bit that occurs between the read and correction circuitry 117 and the encoding circuitry 123 will not be detected. This leaves a gap in data protection or error coding for the data that is flowing through the memory interface 100.

Described herein are methods, systems, and circuitries that provide continuous error coding through a memory interface. In the described methods, systems, and circuitries, data being written is divided into blocks and sets of block check bits are generated using a first error code or a plurality of first error codes. A set of signature bits for the data bits (e.g., the 256 data bits of FIG. 1) is generated based on the sets of block check bits. A set of cumulative check bits for the data bits and signature bits is also generated by use of a second error code. The set of data bits, the set of signature bits, and the set of cumulative check bits are stored in the memory.

In one disclosed example, the cumulative check bits are determined for the data bits and signature bits such that the data bits, the set of signature bits, and the set of cumulative check bits form a code word of the second error code. In some examples, the cumulative check bits may also depend on the write address. The cumulative check bits may be determined such that the data bits, the signature bits determined from the check bits of the blocks of data bits, and bits of the write address or address bits derived from the bits of the write address form a code word of the second error code.

When the data blocks are read from memory, the data bits, the signature bits, and the cumulative check bits may be possibly corrupt. The possibly corrupt data bits and possibly corrupt signature bits may be corrected into corrected data bits and corrected signature bits by a corrector circuitry according to the second error code. In one example, the possibly corrupt cumulative check bits are also corrected.

The corrected data bits are divided into blocks of data bits as they were divided for the generation of block check bits before writing and regenerated block check bits are generated using the first error code(s). The regenerated block check bits may be corrupt due to a fault at an output of the corrector circuitry for the second error code, or an error of the data lines connecting outputs of the corrector circuitry for the second error code, or an error of the data lines connecting outputs of the corrector circuitry for the second error code with inputs of an encoder circuitry for the error code, or a fault within an encoder circuitry for the first error code or another error. Regenerated signature bits are generated based on sets of regenerated block check bits determined for the corrected read data blocks. These regenerated signature bits are compared to the stored signature bits, which were derived from the block check bits prior to storing the data bits. The stored signature bits may be eventually corrected after reading. In this manner the gap in data protection discussed with respect to FIG. 1 can be addressed.

Figure 2:
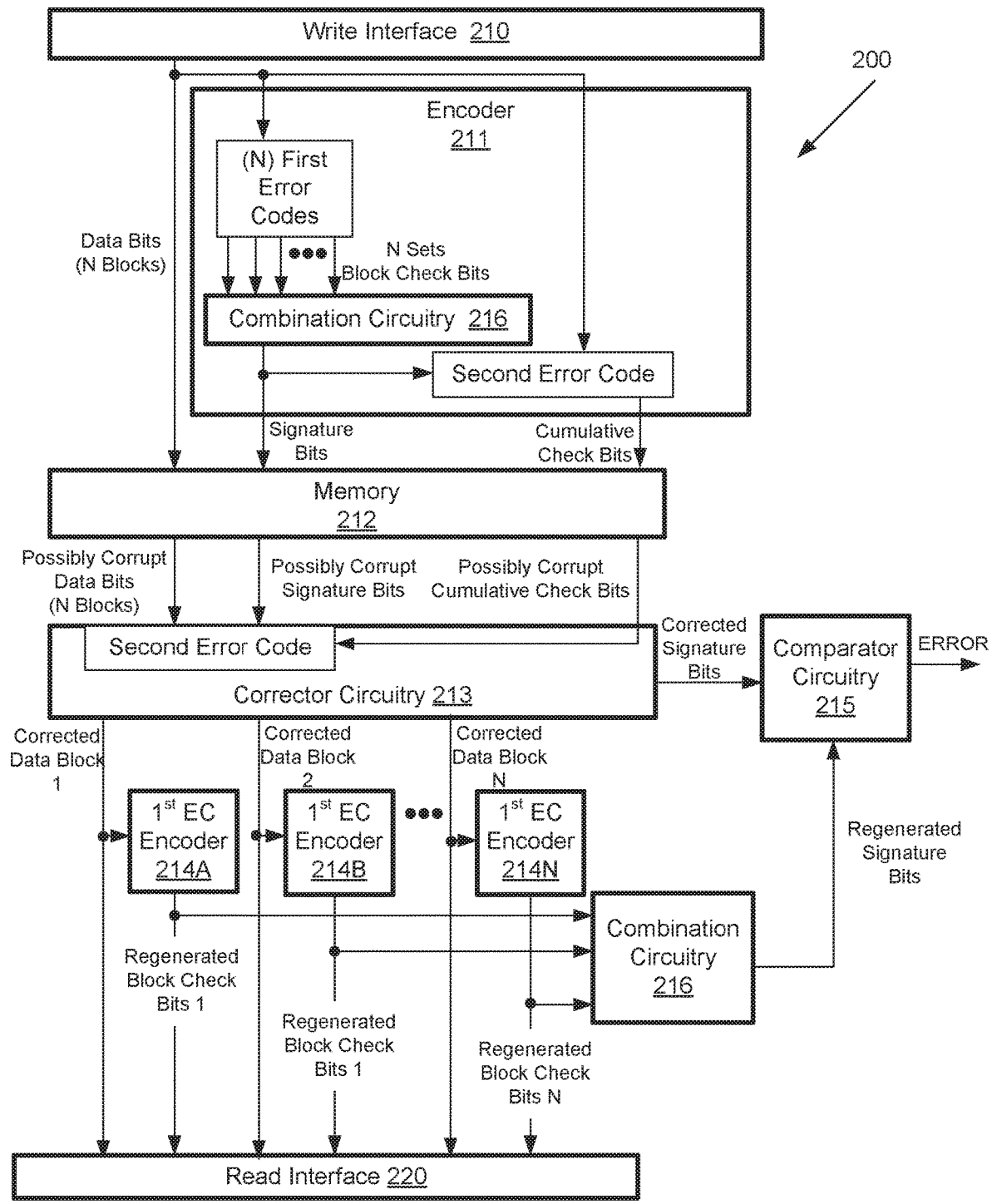
FIG. 2 is a block diagram of an example memory interface that includes continuous error coding to protect data throughout the read/write path in accordance with various aspects described.

Referring now to FIG. 2, a memory interface 200 is illustrated that provides continuous error coding and data protection from a write interface 210 to a read interface 220. In the following description, specific types of error codes (e.g., either error-correcting, error-detecting, or both) may be mentioned to provide context and simplification. Error codes that may be used interchangeably with those given as an example include a Hamming-code, a shortened Hamming code, a BCH error code, a Hsiao error code, a linear error code, or a non-linear error code. Further, when a particular number of bits (e.g., data or check bits) is used as an example, it is to be understood that a different number of bits may be used in other examples.

A write interface 210 assembles data bits that are being written to a memory 212. In one example, the memory being written to is a memory location (e.g., a set of memory cells) addressed by an input address. In another example, the memory may be a register. The write interface 210 divides the data bits into N data blocks. In one example the input data is divided into 16 blocks of 16 data bits each for a total of 256 data bits. The 16 data blocks may form a word stored in the memory 212. The write interface 210 writes the N data blocks to the memory 212.

The N data blocks are also provided to an encoder circuitry 211. The encoder circuitry 211 uses a respective one of N first error codes to encode a respective one of the N data blocks to generate a respective set of block check bits for a total of N sets of block check bits. The N first error codes may be identical to one another or different from one another. The N first error codes may generate different numbers of block check bits. In one example the first error codes are each Hsiao codes which are identical to one another and have code words having 16 data bits and 7 check bits.

Combination circuitry 216 generates a set of signature bits from the N sets of block check bits. In one example, the set of signature bits includes 7 bits and is determined by the combination circuitry as a component-by-component exclusive OR (XOR) operation or exclusive NOR (XNOR) operation on the N sets of block check bits (each set having 7 bits). The set of signature bits is stored in the memory 212. The set of signature bits and the N blocks of data bits are provided to circuitry executing a second error code of the encoder circuitry 211. The second error code is used to generate a set of cumulative check bits for the data bits augmented by the signature bits. In one example, the second error code is a BCH code that generates a set of 18 cumulative check bits. The set of cumulative check bits are also stored in the memory 212.

During a read operation for the same memory 212 (e.g., location, address, register) N blocks of possibly corrupt data bits, possibly corrupt signature bits, and possibly corrupt cumulative check bits are read from the memory by corrector circuitry 213. Bits may become corrupted by, for example, an alpha particle or other cause. The corrector circuitry 213 uses the same second error code (e.g., BCH code) as was used by second error code of the encoder circuitry 211 to generate the cumulative check bits to correct the N blocks of possibly corrupt data bits and the set of possibly corrupt signature bits. In one example the corrector circuitry also corrects the set of cumulative check bits. When the second error code is a 2-bit BCH error-correcting code, all 1-bit errors and all 2-bit errors are errors that can be corrected by means of the error code and consequently also corrected. The corrected data blocks are provided to a read interface 220 where they are forwarded to other devices which carry out further processing.

Each corrected data block is also input to a respective first error code encoder 214 that uses the first error code used by the encoder 211 to generate a respective set of regenerated block check bits for the corrected data block. The set of regenerated block check bits are provided to the read interface 220 so that the subsequent other devices that process the corrected data blocks may check for corrupted data.

A second combination circuitry 216 performs the same combination (e.g., XOR, XNOR) on the N sets of regenerated block check bits to generate a set of regenerated signature bits. This set of regenerated signature bits is provided to a comparator circuitry 215 that compares the set of regenerated signature bits with the set of corrected signature bits. If the comparator circuitry 215 detects a difference, an error signal may be provided that indicates that there is an error in the corrected data bits or has occurred in one of the encoders 214, or an error has occurred outside the memory 213, or an error has occurred that cannot be corrected by means of the second error code.

In one example, the corrector circuitry 213 and second error code are not used. In this embodiment, the signature bits are stored with the data blocks but no cumulative data bits are generated or stored. On read, the regenerated signature bits (generated using possibly corrupt data blocks) are compared to the possibly corrupt signature bits. An error signal is provided when the regenerated signature bits do not match the uncorrected/possibly corrupt signature bits.

Figure 3A:
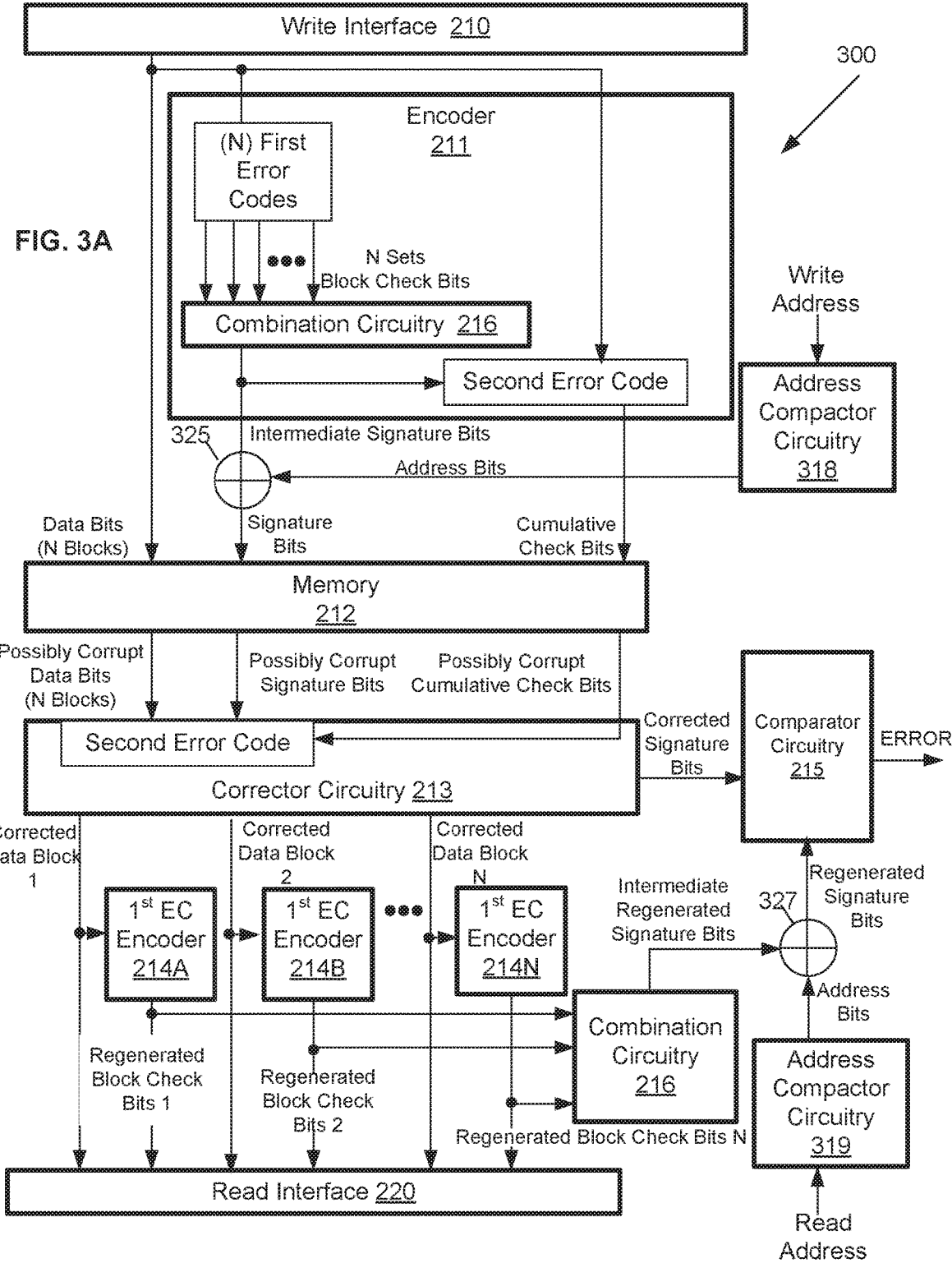
FIG. 3A is a block diagram of an example memory interface that includes continuous error coding based on a memory address to protect data throughout the read/write path in accordance with various aspects described.
Figure 3B:
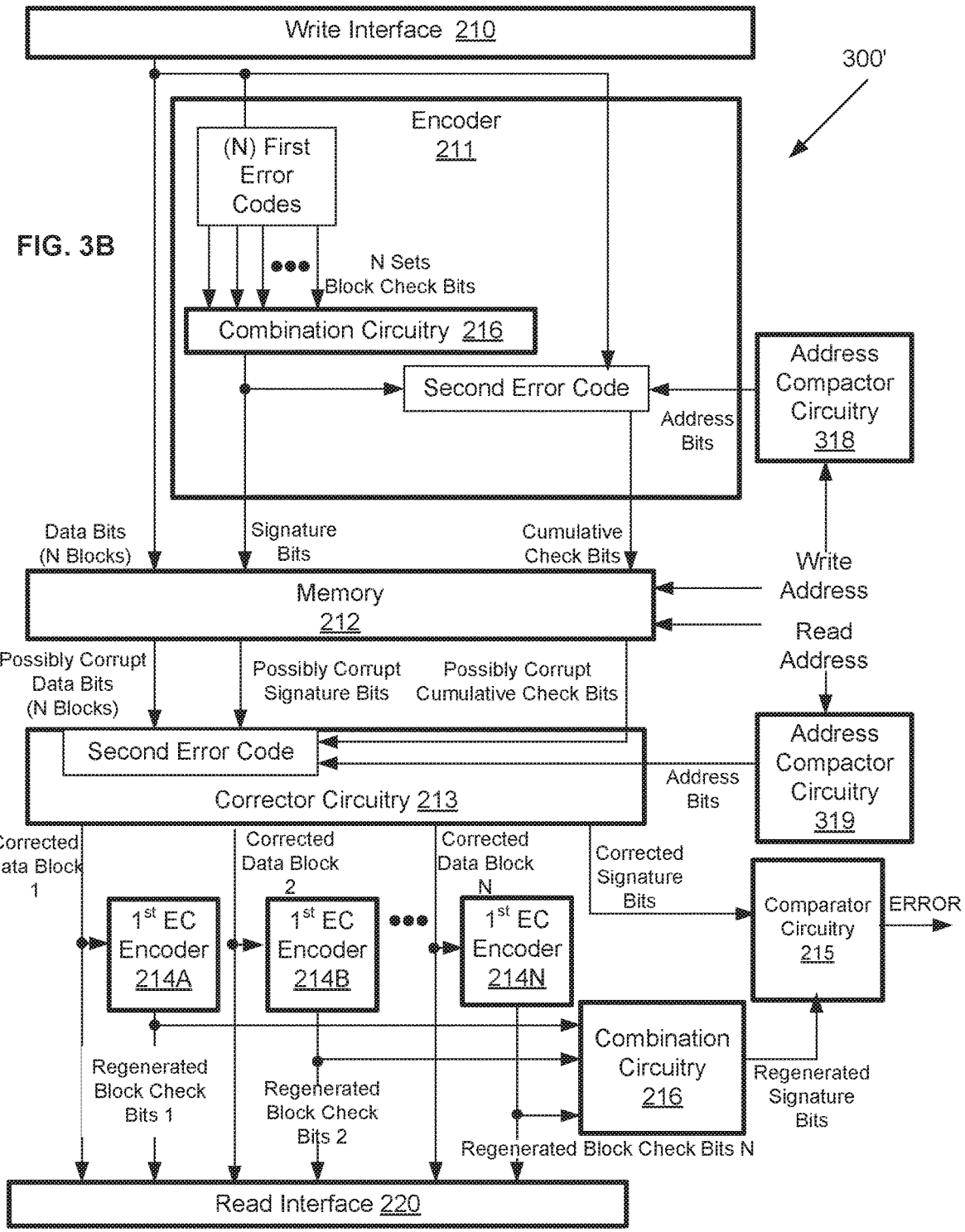
FIG. 3B is a block diagram of an alternative memory interface that includes continuous error coding based on a memory address to protect data throughout the read/write path in accordance with various aspects described.

It is also possible to protect the memory against address errors. There are several possibilities for implementing this address-error detection, two of which are illustrated in FIGS. 3A and 3B. FIG. 3A illustrates an example memory interface 300 that protects against data corruption and also against address errors. The interface 300 includes the components of the interface 200 as well as upstream address compactor circuitry 318 and upstream summing element 325 and downstream address compactor circuitry 319 and downstream summing element 327. Components which have the same reference signs as components in the preceding figure fundamentally have the same functions as the corresponding components in the preceding figure.

During the write operation, the signature bits are not written directly to the memory 212 as with interface 200. Instead, the signature bits generated by the combination circuitry 216 (referred to now as intermediate signature bits) are combined (by way of summing element 325) with address bits that are generated by the upstream address compactor circuitry 318. The resulting bits are stored, as the set of signature bits, in the memory 212.

The upstream address compactor 318 compacts the write address to form a compacted write address which may contain fewer bits than the write address. The upstream summing element 325 adds the compacted write address in a component-by-component manner to the signature bits using modulo 2 and outputs the set of signature bits.

When a read operation is performed on the same address, possibly corrupt data bits, possibly corrupt signature bits, and possibly corrupt cumulative check bits are read from the memory 212. The corrector circuitry 213 corrects the possibly corrupt data bits (N blocks) and the possibly corrupt signature bits. The corrected data bits are provided to the read interface 220.

The encoders 214 generate a set of regenerated block check bits for each of the corrected data blocks. The sets of regenerated block check bits are input to combination circuitry 216 which generates intermediate regenerated signature bits.

The downstream address compactor 319 compacts the read address to form a compacted read address which may contain fewer bits than the read address. The downstream summing element 327 adds the compacted read address in a component-by-component manner to the intermediate regenerated signature bits using modulo 2 and outputs the set of regenerated signature bits.

The comparator circuitry 215 compares the set of regenerated signature bits with the set of corrected signature bits (that was encoded with the compacted write address) and provides an error signal when there is a mismatch. In one example an error signal corresponds to a logical 1 while a logical 0 output by the comparator circuitry 215 indicates no error.

The set of signature bits may be generated in a manner different from the above described component-by-component XOR/XNOR operation on each corresponding bit of the sets of block check bits. For example, three different first error codes may be used to generate sets of block check bits, the first and second first error codes generating 4 block check bits and the third first error code generating 7 block check bits. The signature bits may be generated using a component-by-component XOR (or XNOR) sum of the 4 block check bits of the first first error code, the second first error code, and the first 4 block check bits of the third first error code. Fifth to seventh bits of the signature bits may then correspond to the fifth to seventh bits of the block check bits generated by the third first error code.

Alternatively, it is an option to generate the first four signature bits as a component-by-component XOR (or XNOR) sum of the first four bits of the third first error code block check bits and the four bits of the first first error code block check bits. The fifth to seventh bits of the signature bits may be generated as a component-by-component XOR (or XNOR) sum of fifth to seventh bits of the block check bits generated by the third first error code and the first three bits of the block check bits generated by the second first error code. An eighth bit of the signature bits may be determined as the fourth bit of the second first error code block check bits.

FIG. 3B illustrates an alternative example memory interface 300' that protects against data corruption and also against address errors. In this example, the cumulative check bits (rather than the signature bits as in the example of FIG. 3A) are dependent upon the memory address. The cumulative check bits are determined as the check bits of the second error code of the data bits, the signature bits, and the compacted address bits generated by address compactor circuitry 318. In one example, the compacted address bits are not stored in the memory. Alternatively the address bits or compacted address bits derived from the write address are stored in the memory along with the data bits, signature bits, and cumulative check bits. When data is read from the memory, the cumulative check bits are determined as the check bits of the second error code of the corrected data bits, the corrected signature bits and the compacted address bits of the read address.

The compacted address bits $A_S$ may be determined (e.g., by compactor 318 or 319 of FIGS. 3A and 3B) from the bits of the write address $a_s$, such that:

$$A_S = M \cdot a_s \qquad \text{EQ. 1}$$

where $A_S$ is a column vector of k components of the compacted write address and $a_s$ is a column vector of l components of the write address. M is a binary matrix having l columns and k rows and k is the number of components of A. In this case, the columns of the matrix M can be selected to be different in pairs and $k \leq l$.

The compacted address bits $A_L$ can then be determined from the bits of the read address $a_L$ in such a manner that:

$$A_L = M \cdot a_L \qquad \text{EQ. 2}$$

In this case, $A_S$ and $A_L$ denote k-dimensional column vectors and $a_S$ and $a_L$ denote l-dimensional column vectors. It is also an option to choose an l-dimensional unit matrix as the matrix M, with the result that the compacted address bits are the same as the address bits. This may be advantageous if the number l of bits of the address bits is a small number.

Figure 4:
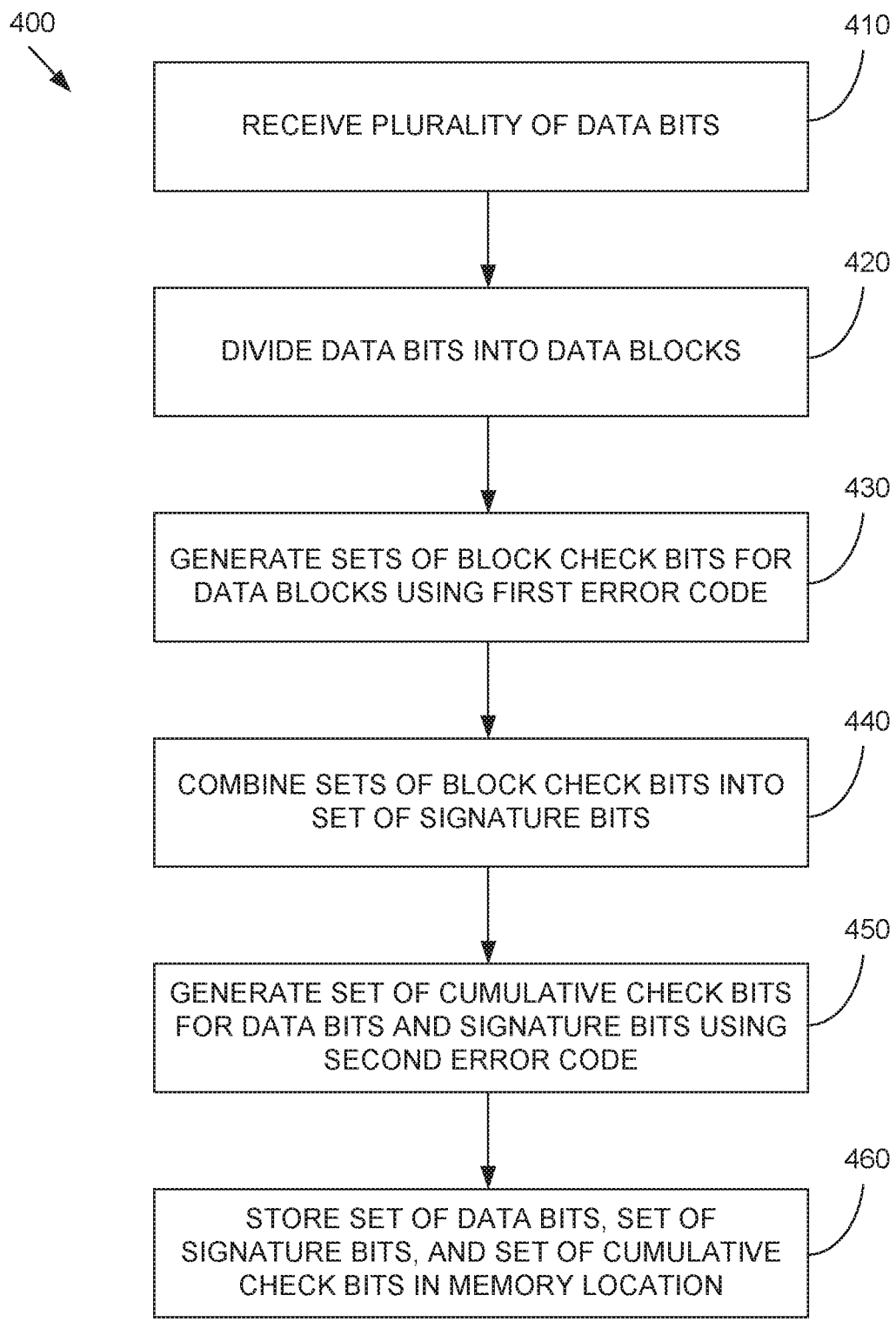
FIG. 4 is a flow diagram outlining an example method for storing data using first and second error coding in accordance with various aspects described.

FIG. 4 illustrates an example method 400 for providing continuous error coding through a read/write path. The method 400 may be performed by the interface 200, 300 of FIGS. 2, 3A, 3B, respectively. The method includes, at 410, receiving a plurality of data bits. The method includes, at 420, dividing the plurality of data bits into at least two data blocks. The method includes, at 430, generating respective sets of block check bits for each respective data block using a respective first error code. The method includes, at 440, combining the sets of block check bits to generate a set of signature bits for the plurality of data bits. The method includes, at 450, generating a set of cumulative check bits for the plurality of data bits and the set of signature bits using a second error code. The method includes, at 460, storing, in a memory location, the plurality of data bits, the set of signature bits, and the set of cumulative check bits.

Figure 5:
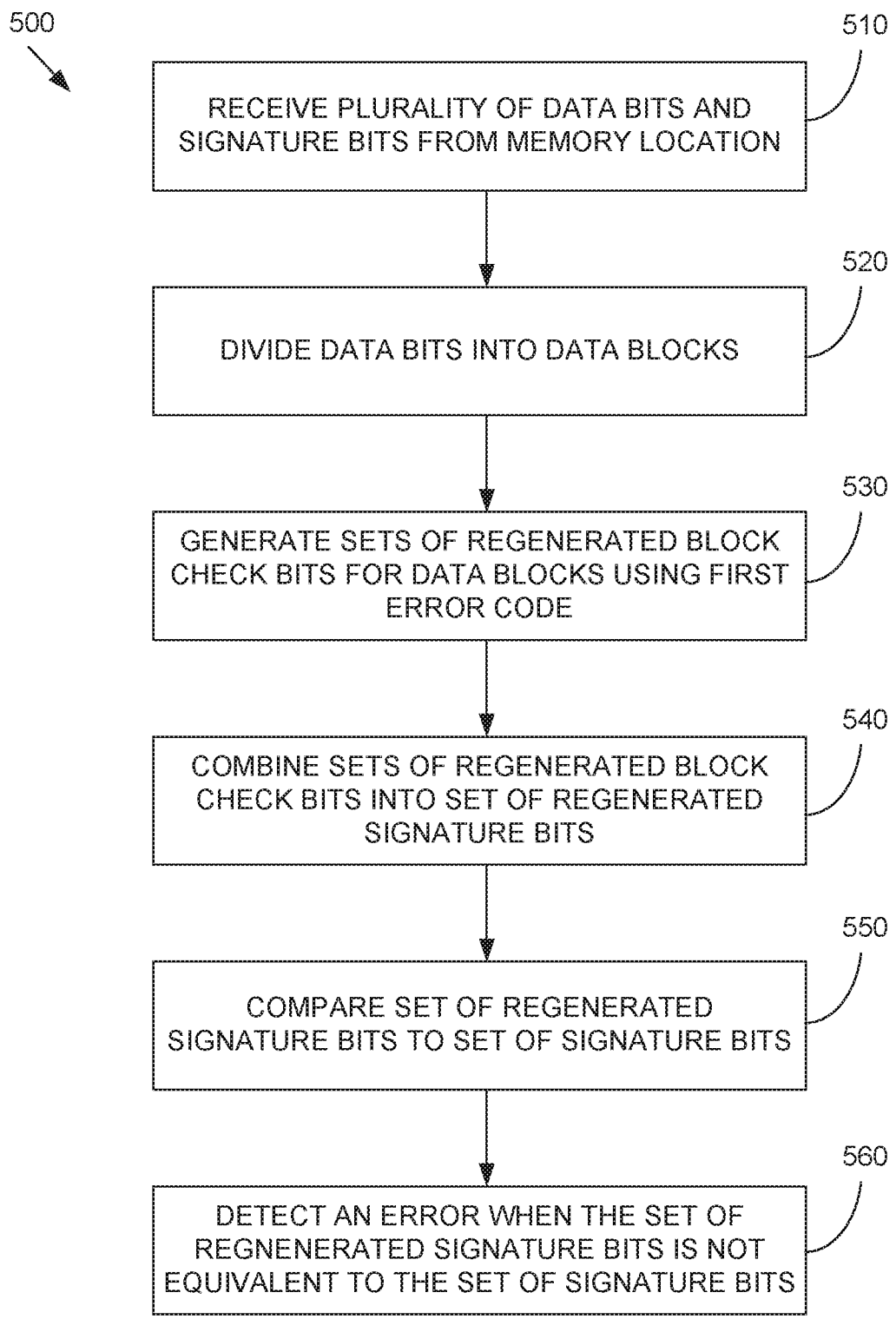
FIG. 5 is a flow diagram outlining an example method for reading data in accordance with various aspects described.

FIG. 5 illustrates an example method 500 for providing continuous error coding through a read/write path. The method 500 may be performed by the interface 200, 300 of FIGS. 2, 3A, 3B, respectively. The method includes, at 510, receiving, from a memory location, a plurality of data bits and a set of further bits that includes a set of signature bits. The method includes, at 520, dividing the plurality of data bits into at least two data blocks. The method includes, at 530, generating a respective set of regenerated block check bits for each respective data block using a respective first error code. The method includes, at 540, combining the sets of regenerated block check bits to generate a set of regenerated signature bits. The method includes, at 550, comparing the set of regenerated signature bits to the set of signature bits. The method includes, at 560, detecting an error when the set of regenerated signature bits is not equivalent to the set of signature bits.

The methods of FIGS. 4 and 5 may be performed more than once in succession.

It can be seen from the foregoing description that the described systems, circuitries, and methods allow for continuous error coding and data protection through a read/write path or memory interface.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, circuitries, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

Examples can include subject matter such as a method, means for performing acts or blocks of the method, at least one machine-readable medium including instructions that, when performed by a machine cause the machine to provide continuous error coding according to embodiments and examples described herein.

Example 1 is a method, including receiving a plurality of data bits; dividing the plurality of data bits into at least two data blocks; generating respective sets of block check bits for each respective data block using a respective first error code; combining the sets of block check bits to generate a set of signature bits for the plurality of data bits; generating a set of cumulative check bits for the plurality of data bits and the set of signature bits using a second error code; and storing, in a memory location, the plurality of data bits, the set of signature bits, and the set of cumulative check bits.

Example 2 includes the subject matter of example 1, including or omitting optional subject matter, wherein the sets of block check bits include the same number of bits.

Example 3 includes the subject matter of example 1, including or omitting optional subject matter, wherein the sets of block check bits include different numbers of bits.

Example 4 includes the subject matter of example 1, including or omitting optional subject matter, including using a same first error code to generate the sets of block check bits for different data blocks.

Example 5 includes the subject matter of example 1, including or omitting optional subject matter, including using different first error codes to generate the sets of block check bits for different data blocks.

Example 6 includes the subject matter of example 1, including or omitting optional subject matter, including performing a component-by-component exclusive OR (XOR) or exclusive NOR (XNOR) operation on the sets of block check bits to generate the set of signature bits.

Example 7 includes the subject matter of example 1, including or omitting optional subject matter, including generating a set of address bits determined by address bits of a memory address for the memory location; and combining the sets of block check bits and the set of address bits to generate the set of signature bits for the plurality of data bits.

Example 8 includes the subject matter of example 7, including or omitting optional subject matter, including performing a component-by-component exclusive OR (XOR) exclusive NOR (XNOR) operation on the sets of block check bits to generate a set of intermediate signature bits; and performing a component-by-component addition of the set of intermediate signature bits and the set of address bits to generate the set of signature bits.

Example 9 includes the subject matter of example 1, including or omitting optional subject matter, including generating a set of address bits determined by the address bits of a memory address for the memory location; generating the set of cumulative check bits based on the address bits.

Example 10 includes the subject matter of example 1, including or omitting optional subject matter, wherein the first error code is an error-detecting or an error-correcting code and the second error code is an error-detecting or an error-correcting code.

Example 11 includes the subject matter of example 1, including or omitting optional subject matter, wherein the first error code and the second error code are each one of a Hamming-code, a shortened Hamming code, a BCH error code, a Hsiao error code, a linear error code, or a non-linear error code.

Example 12 is a method, including receiving, from a memory location, a plurality of data bits and a set of further bits that includes a set of signature bits; dividing the plurality of data bits into at least two data blocks; generating a respective set of regenerated block check bits for each respective data block using a respective first error code; combining the sets of regenerated block check bits to generate a set of regenerated signature bits; comparing the set of regenerated signature bits to the set of signature bits; and detecting an error when the set of regenerated signature bits is not equivalent to the set of signature bits.

Example 13 includes the subject matter of example 12, including or omitting optional subject matter, wherein the set of further bits includes a set of cumulative check bits, the method further including correcting the plurality of data bits using the set of cumulative check bits and a second error code prior to dividing the plurality of data bits into at least two data blocks.

Example 14 includes the subject matter of example 13, including or omitting optional subject matter, further including correcting the set of signature bits using the set of cumulative check bits and second error code prior to comparing the set of regenerated signature bits to the set of signature bits.

Example 15 includes the subject matter of example 13, including or omitting optional subject matter, wherein the first error code is an error-detecting or an error-correcting code and the second error code is an error-detecting or an error-correcting code.

Example 16 includes the subject matter of example 13, including or omitting optional subject matter, wherein the first error code and the second error code are each one of a Hamming-code, a shortened Hamming code, a BCH error code, a Hsiao error code, a linear error code, or a non-linear error code.

Example 17 includes the subject matter of example 12, including or omitting optional subject matter, including using a same first error code to generate the sets of regenerated block check bits for different corrected data blocks.

Example 18 includes the subject matter of example 12, including or omitting optional subject matter, including using different first error codes to generate the sets of regenerated block check bits for different corrected data blocks.

Example 19 includes the subject matter of example 12, including or omitting optional subject matter, including performing a component-by-component exclusive OR (XOR) or exclusive NOR (XNOR) operation on the sets of regenerated block check bits to generate the set of regenerated signature bits.

Example 20 includes the subject matter of example 19, including or omitting optional subject matter, including generating a set of address bits based on a memory address for the memory location; and combining the sets of regenerated block check bits and the set of address bits to generate the set of regenerated signature bits.

Example 21 includes the subject matter of example 20, including or omitting optional subject matter, including performing a component-by-component exclusive OR (XOR) or exclusive NOR (XNOR) operation on the sets of regenerated block check bits to generate a set of intermediate regenerated signature bits; and performing a component-by-component addition of the set of intermediate regenerated signature bits and the set of address bits to generate the set of regenerated signature bits.

Example 22 includes the subject matter of example 12, including or omitting optional subject matter, including generating a set of address bits determined by the address bits of a memory address for the memory location; and generating the set of cumulative check bits based on the address bits.

Example 23 is a method, including receiving a plurality of data bits; dividing the plurality of data bits into at least two data blocks; generating respective sets of block check bits for each respective data block using a respective first error code; combining the sets of block check bits to generate a set of signature bits for the plurality of data bits; storing, in a memory location, the plurality of data bits and the set of signature bits; receiving, from the memory location, a second plurality of data bits and a set of further bits; dividing the second plurality of data bits into at least two data blocks; generating a respective set of regenerated block check bits for each respective data block using the respective first error code; combining the sets of regenerated block check bits to generate a set of regenerated signature bits; comparing the set of regenerated signature bits to the set of further bits; and detecting an error when the set of regenerated signature bits is not equivalent to the set of further bits.

Example 24 is a system, including a memory; and an encoder. The encoder is configured to receive a plurality of data bits; divide the plurality of data bits into at least two data blocks; generate respective sets of block check bits for each respective data block using a respective first error code; combine the sets of block check bits to generate a set of signature bits for the plurality of data bits; generate a set of cumulative check bits for the plurality of data bits and the set of signature bits using a second error code; and store, in a memory location of the memory, the plurality of data bits, the set of signature bits, and the set of cumulative check bits.

Example 25 includes the subject matter of example 24, including or omitting optional subject matter, wherein the sets of block check bits include the same number of bits.

Example 26 includes the subject matter of example 24, including or omitting optional subject matter, wherein the sets of block check bits include different numbers of bits.

Example 27 includes the subject matter of example 24, including or omitting optional subject matter, wherein the encoder is configured to use a same first error code to generate the sets of block check bits for different data blocks.

Example 28 includes the subject matter of example 24, including or omitting optional subject matter, wherein the encoder is configured to use different first error codes to generate the sets of block check bits for different data blocks.

Example 29 includes the subject matter of example 24, including or omitting optional subject matter, wherein the encoder is configured to perform a component-by-component exclusive OR (XOR) or exclusive NOR (XNOR) operation on the sets of block check bits to generate the set of signature bits.

Example 30 includes the subject matter of example 24, including or omitting optional subject matter, wherein the encoder is configured to generate a set of address bits determined by address bits of a memory address for the memory location; and combine the sets of block check bits and the set of address bits to generate the set of signature bits for the plurality of data bits.

Example 31 includes the subject matter of example 30, including or omitting optional subject matter, wherein the encoder is configured to perform a component-by-component exclusive OR (XOR) exclusive NOR (XNOR) operation on the sets of block check bits to generate a set of intermediate signature bits; and perform a component-by-component addition of the set of intermediate signature bits and the set of address bits to generate the set of signature bits.

Example 32 includes the subject matter of example 24, including or omitting optional subject matter, wherein the encoder is configured to generate a set of address bits determined by the address bits of a memory address for the memory location; and generate the set of cumulative check bits based on the address bits.

Example 33 includes the subject matter of example 24, including or omitting optional subject matter, wherein the first error code is an error-detecting or an error-correcting code and the second error code is an error-detecting or an error-correcting code.

Example 34 includes the subject matter of example 24, including or omitting optional subject matter, wherein the first error code and the second error code are each one of a Hamming-code, a shortened Hamming code, a BCH error code, a Hsiao error code, a linear error code, or a non-linear error code.

Example 35 is a system, including a memory, corrector circuitry, a plurality of first error encoders, combination circuitry, and comparator circuitry. The corrector circuitry is configured to receive, from a memory location, a plurality of data bits and a set of further bits that includes a set of signature bits; and divide the plurality of data bits into at least two data blocks. The plurality of first error code encoders is configured to generate a respective set of regenerated block check bits for each respective data block using a respective first error code. The combination circuitry is configured to combine the sets of regenerated block check bits to generate a set of regenerated signature bits. The comparator circuitry is configured to compare the set of regenerated signature bits to the set of signature bits; and detect an error when the set of regenerated signature bits is not equivalent to the set of signature bits.

Example 36 includes the subject matter of example 35, including or omitting optional subject matter, wherein the set of further bits includes a set of cumulative check bits, the corrector circuitry further configured to correct the plurality of data bits using the set of cumulative check bits and a second error code prior to dividing the plurality of data bits into at least two data blocks.

Example 37 includes the subject matter of example 36, including or omitting optional subject matter, the corrector circuitry further configured to correct the set of signature bits using the set of cumulative check bits and second error code prior to comparing the set of regenerated signature bits to the set of signature bits.

Example 38 includes the subject matter of example 36, including or omitting optional subject matter, wherein the first error code is an error-detecting or an error-correcting code and the second error code is an error-detecting or an error-correcting code.

Example 39 includes the subject matter of example 36, including or omitting optional subject matter, wherein the first error code and the second error code are each one of a Hamming-code, a shortened Hamming code, a BCH error code, a Hsiao error code, a linear error code, or a non-linear error code.

Example 40 includes the subject matter of example 35, including or omitting optional subject matter, wherein the plurality of first error code encoders are configured to use a same first error code to generate the sets of regenerated block check bits for different corrected data blocks.

Example 41 includes the subject matter of example 35, including or omitting optional subject matter, wherein the plurality of first error code encoders are configured to use different first error codes to generate the sets of regenerated block check bits for different corrected data blocks.

Example 42 includes the subject matter of example 35, including or omitting optional subject matter, wherein the combination circuitry is configured to perform a componentby-component exclusive OR (XOR) or exclusive NOR (XNOR) operation on the sets of regenerated block check bits to generate the set of regenerated signature bits.

Example 43 includes the subject matter of example 42, including or omitting optional subject matter, further including address compactor circuitry configured to generate a set of address bits based on a memory address for the memory location; and a summing element configured to combine the sets of regenerated block check bits and the set of address bits to generate the set of regenerated signature bits.

Example 44 includes the subject matter of example 43, including or omitting optional subject matter, wherein the combination circuitry is configured to perform a component-by-component exclusive OR (XOR) or exclusive NOR (XNOR) operation on the sets of regenerated block check bits to generate a set of intermediate regenerated signature bits; and the summing element is configured to perform a component-by-component addition of the set of intermediate regenerated signature bits and the set of address bits to generate the set of regenerated signature bits.

Example 45 includes the subject matter of example 35, including or omitting optional subject matter, including address compactor circuitry configured to generate a set of address bits determined by the address bits of a memory address for the memory location; and wherein the corrector circuitry is configured to generate the set of cumulative check bits based on the address bits.

Example 46 is a method, including receiving a plurality of data bits; dividing the plurality of data bits into at least two data blocks; generating respective sets of block check bits for each respective data block using a respective first error code; combining the sets of block check bits to generate a set of signature bits for the plurality of data bits; generating a set of cumulative check bits for the plurality of data bits and the signature bits using a second error code; storing, in a memory location, the plurality of data bits, the set of signature bits, and the set of cumulative check bits; receiving, from the memory location, a second plurality of data bits and a set of further bits; dividing the second plurality of data bits into at least two data blocks; generating a respective set of regenerated block check bits for each respective data block using the respective first error code; combining the sets of regenerated block check bits to generate a set of regenerated signature bits; comparing the set of regenerated signature bits to the set of further bits; and detecting an error when the set of regenerated signature bits is not equivalent to the set of further bits.

Example 47 is a method, including receiving a plurality of data bits; dividing the plurality of data bits into at least two data blocks; generating respective sets of block check bits for each respective data block using a respective first error code; combining the sets of block check bits to generate a set of signature bits for the plurality of data bits; generating a set of cumulative check bits for the plurality of data bits and the signature bits using a second error code; storing, in a memory location, the plurality of data bits, the set of signature bits, and the set of cumulative check bits; receiving, from the memory location, a second plurality of data bits, a second set of signature bits, and a second set of cumulative check bits; correcting the second plurality of data bits and the second set of signature bits using the second set of cumulative check bits and the second error code to generate a plurality of corrected data bits and a set of corrected signature bits; dividing the plurality of corrected data bits into at least two corrected data blocks; generating a respective set of regenerated block check bits for each respective corrected data block using the respective first error code; combining the sets of regenerated block check bits to generate a set of regenerated signature bits; comparing the set of regenerated signature bits to the set of corrected signature bits; and detecting an error when the set of regenerated signature bits is not equivalent to the set of corrected signature bits.

The foregoing description of one or more implementations provides illustration and description, but is not intended to be exhaustive or to limit the scope of the example embodiments to the precise form disclosed. Modifications and variations are possible in light of the above teachings or may be acquired from practice of various implementations of the example embodiments.

Various illustrative logics, logical blocks, modules, circuitries, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In the present disclosure like reference numerals are used to refer to like elements throughout, and wherein the illustrated structures and devices are not necessarily drawn to scale. As utilized herein, terms "module", "component," "system," "circuit," "circuitry," "element," "slice," and the like are intended to refer to a computer-related entity, hardware, software (e.g., in execution), and/or firmware. For example, circuitry or a similar term can be a processor, a process running on a processor, a controller, an object, an executable program, a storage device, and/or a computer with a processing device. By way of illustration, an application running on a server and the server can also be circuitry. One or more circuitries can reside within a process, and circuitry can be localized on one computer and/or distributed between two or more computers. A set of elements or a set of other circuitry can be described herein, in which the term "set" can be interpreted as "one or more."

As another example, circuitry or similar term can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, circuitry can be an apparatus that provides specific functionality through electronic components without mechanical parts; the electronic components can include field gates, logical components, hardware encoded logic, register transfer logic, one or more processors therein to execute software and/or firmware that confer(s), at least in part, the functionality of the electronic components.

It will be understood that when an element is referred to as being "electrically connected" or "electrically coupled" to another element, it can be physically connected or coupled to the other element such that current and/or electromagnetic radiation can flow along a conductive path formed by the elements. Intervening conductive, inductive, or capacitive elements may be present between the element and the other element when the elements are described as being electrically coupled or connected to one another. Further, when electrically coupled or connected to one another, one element may be capable of inducing a voltage or current flow or propagation of an electro-magnetic wave in the other element without physical contact or intervening components. Further, when a voltage, current, or signal is referred to as being "applied" to an element, the voltage, current, or signal may be conducted to the element by way of a physical connection or by way of capacitive, electro-magnetic, or inductive coupling that does not involve a physical connection.

Use of the word exemplary is intended to present concepts in a concrete fashion. The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof. As used herein the term "or" includes the option of all elements related by the word or. For example A or B is to be construed as include only A, only B, and both A and B. Further the phrase "one or more of" followed by A, B, or C is to be construed as including A, B, C, AB, AC, BC, and ABC

What is claimed is:

1. A method, comprising:
receiving a plurality of data bits;
dividing the plurality of data bits into at least two data blocks;
generating respective sets of block check bits for each respective data block using a respective first error code;
combining the sets of block check bits to generate a set of signature bits for the plurality of data bits;
generating a set of cumulative check bits for the plurality of data bits and the set of signature bits using a second error code; and
storing, in a memory location, the plurality of data bits, the set of signature bits, and the set of cumulative check bits.

2. The method of claim 1, wherein the sets of block check bits include different numbers of bits.

3. The method of claim 1, comprising using different first error codes to generate the sets of block check bits for different data blocks.

4. The method of claim 1, comprising:
generating a set of address bits determined by address bits of a memory address for the memory location; and
combining the sets of block check bits and the set of address bits to generate the set of signature bits for the plurality of data bits.

5. The method of claim 1, comprising:
generating a set of address bits determined by the address bits of a memory address for the memory location; and
generating the set of cumulative check bits based on the address bits.

6. A method, comprising:
receiving, from a memory location, a plurality of data bits and a set of further bits that includes a set of signature bits;
dividing the plurality of data bits into at least two data blocks;
generating a respective set of regenerated block check bits for each respective data block using a respective first error code;
combining the sets of regenerated block check bits to generate a set of regenerated signature bits; and
comparing the set of regenerated signature bits to the set of signature bits; and
detecting an error when the set of regenerated signature bits is not equivalent to the set of signature bits.

7. The method of claim 6, wherein the set of further bits includes a set of cumulative check bits, the method further comprising:
correcting the plurality of data bits using the set of cumulative check bits and a second error code prior to dividing the plurality of data bits into at least two data blocks.

8. The method of claim 7, further comprising correcting the set of signature bits using the set of cumulative check bits and second error code prior to comparing the set of regenerated signature bits to the set of signature bits.

9. The method of claim 6, comprising using different first error codes to generate the sets of regenerated block check bits for different corrected data blocks.

10. The method of claim 6, comprising:
generating a set of address bits based on a memory address for the memory location; and
combining the sets of regenerated block check bits and the set of address bits to generate the set of regenerated signature bits.

11. The method of claim 6, comprising:
generating a set of address bits determined by the address bits of a memory address for the memory location; and
generating a set of cumulative check bits based on the address bits.

12. A system, comprising:
a memory; and
an encoder configured to:
receive a plurality of data bits;
divide the plurality of data bits into at least two data blocks;
generate respective sets of block check bits for each respective data block using a respective first error code;
combine the sets of block check bits to generate a set of signature bits for the plurality of data bits;
generate a set of cumulative check bits for the plurality of data bits and the set of signature bits using a second error code; and store, in a memory location of the memory, the plurality of data bits, the set of signature bits, and the set of cumulative check bits.

13. The system of claim 12, wherein the sets of block check bits include different numbers of bits.

14. The system of claim 12, wherein the encoder is configured to use different first error codes to generate the sets of block check bits for different data blocks.

15. The system of claim 12, wherein the encoder is configured to:
generate a set of address bits determined by address bits of a memory address for the memory location; and
combine the sets of block check bits and the set of address bits to generate the set of signature bits for the plurality of data bits.

16. The system of claim 12, wherein the encoder is configured to:
generate a set of address bits determined by the address bits of a memory address for the memory location; and
generate the set of cumulative check bits based on the address bits.

17. A system, comprising:
a memory;
corrector circuitry configured to:
receive, from a memory location, a plurality of data bits and a set of further bits that includes a set of signature bits; and
divide the plurality of data bits into at least two data blocks;
a plurality of first error code encoders configured to generate a respective set of regenerated block check bits for each respective data block using a respective first error code;
combination circuitry configured to combine the sets of regenerated block check bits to generate a set of regenerated signature bits; and
a comparator circuitry configured to:
compare the set of regenerated signature bits to the set of signature bits; and
detect an error when the set of regenerated signature bits is not equivalent to the set of signature bits.

18. The system of claim 17, wherein the set of further bits includes a set of cumulative check bits, the corrector circuitry further configured to correct the plurality of data bits using the set of cumulative check bits and a second error code prior to dividing the plurality of data bits into at least two data blocks.

19. The system of claim 18, the corrector circuitry further configured to correct the set of signature bits using the set of cumulative check bits and second error code prior to comparing the set of regenerated signature bits to the set of signature bits.

20. The system of claim 17, wherein the plurality of first error code encoders are configured to use different first error codes to generate the sets of regenerated block check bits for different corrected data blocks.

21. The system of claim 20, further comprising:
address compactor circuitry configured to generate a set of address bits based on a memory address for the memory location; and
a summing element configured to combine the sets of regenerated block check bits and the set of address bits to generate the set of regenerated signature bits.

22. The system of claim 17, comprising:
address compactor circuitry configured to generate a set of address bits determined by the address bits of a memory address for the memory location; and
wherein the corrector circuitry is configured to generate a set of cumulative check bits based on the address bits.

23. A method, comprising:
receiving a plurality of data bits;
dividing the plurality of data bits into at least two data blocks;
generating respective sets of block check bits for each respective data block using a respective first error code;
combining the sets of block check bits to generate a set of signature bits for the plurality of data bits;
storing, in a memory location, the plurality of data bits and the set of signature bits;
receiving, from the memory location, a second plurality of data bits and a set of further bits;
dividing the second plurality of data bits into at least two data blocks;
generating a respective set of regenerated block check bits for each respective data block using the respective first error code;
combining the sets of regenerated block check bits to generate a set of regenerated signature bits; and
comparing the set of regenerated signature bits to the set of further bits; and
detecting an error when the set of regenerated signature bits is not equivalent to the set of further bits.

* * * * *